United States Patent
Black-Ziegelbein et al.

(10) Patent No.: US 7,272,824 B2
(45) Date of Patent: Sep. 18, 2007

(54) METHOD FOR RUNTIME DETERMINATION OF AVAILABLE INPUT ARGUMENT TYPES FOR A SOFTWARE PROGRAM

(75) Inventors: Elizabeth Ann Black-Ziegelbein, Austin, TX (US); Oltea Mihaela Herescu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/383,360

(22) Filed: Mar. 6, 2003

(65) Prior Publication Data

US 2004/0177349 A1  Sep. 9, 2004

(51) Int. Cl.
G06F 9/44 (2006.01)
(52) U.S. Cl. ...................... 717/126; 717/171
(58) Field of Classification Search ................ 717/100, 717/124
See application file for complete search history.

(56) References Cited

U.S. PATENT DOCUMENTS

| | | | | |
|---|---|---|---|---|
| 5,357,452 A * | 10/1994 | Pio-di-Savoia et al. | ..... | 702/108 |
| 5,671,351 A * | 9/1997 | Wild et al. | ..... | 714/38 |
| 5,856,984 A * | 1/1999 | Rushworth | ..... | 714/724 |
| 6,216,137 B1 | 4/2001 | Nguyen et al. | ..... | 707/203 |
| 6,339,839 B1 | 1/2002 | Wang | ..... | 717/146 |
| 2003/0014734 A1* | 1/2003 | Hartman et al. | ..... | 717/125 |
| 2003/0097650 A1* | 5/2003 | Bahrs et al. | ..... | 717/124 |
| 2004/0128651 A1* | 7/2004 | Lau | ..... | 717/124 |
| 2004/0128652 A1* | 7/2004 | Mandava et al. | ..... | 717/124 |

OTHER PUBLICATIONS

"Migrating WebGain VisualCafe Web applications deployed on BEA WebLogic Servers to IBM WebSphere Studio Application Developer—Part 3", Black, et al. http://www7b.boulder.ibm.com, Jan. 15, 2003.
"Migrating BEA WebLogic Server Applications to IBM WebSphere Application Server", IBM, http://www7b.boulder.ibm.com, Jan. 15, 2003.
"Migrating to IBM WebSphere Application Server—Part 2 Stages of Migration", Beaton, http://www7b.boulder.ibm.com, Jan. 15, 2003.

* cited by examiner

Primary Examiner—Tuan Dam
Assistant Examiner—Chrystine Pham
(74) Attorney, Agent, or Firm—Robert H. Frantz; David A. Mims, Jr.

(57) ABSTRACT

An infrastructure for handling the administration of possible and mandatory input arguments at runtime for software program code. A user alterable argument descriptor file (ADF) stores all information related to input and output arguments for a software program and its constituent subpieces. During invocation of a software program, all command line flags and values are validated against the ADF, and valid pairs are stored in a key/value dictionary which is passed to the software program. Each subpiece of the software program may then access its needed arguments from the dictionary independently of other subpieces, thereby allowing modifications to subpieces which require new or changed arguments without the need to recompile the entire software program.

18 Claims, 4 Drawing Sheets

METHOD FOR RUNTIME DETERMINATION OF AVAILABLE INPUT ARGUMENT TYPES FOR A SOFTWARE PROGRAM

CROSS-REFERENCE TO RELATED APPLICATIONS (CLAIMING BENEFIT UNDER 35 U.S.C. 120)

Not applicable

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to methods and systems for determining, defining, and controlling input and output arguments for computer programs, and especially to methods for adapting input and output argument definition from one format to another such as during migration of existing programs from one computing environment to another.

2. Background of the Invention

When designing a software program, it is often the case that the program design relies on particular program inputs from the end user to be able to run and execute correctly. One method of obtaining these inputs is to "pass in" arguments to the program when invoking the program from the command line. In some cases, for programs which create output, the output can be redirected or "piped" to a destination indicated by a command line argument, as well.

Often, when there are multiple input arguments, the arguments are prefixed with a unique identifying flag that the program then uses to determine what the input argument should be used for. For example, if there exists a program called "MyProgram" that receives as input a user's first and last name, the program might be invoked from the command line as:

Java MyProgram-first Ann-last Black wherein "-first" is the unique flag identifier for the first name, and "Ann" is the argument value to process as the first name, "-last" is the unique flag identifier for the last name, and "Black" is the value to process as the last name. The flag and argument pair will be referred to as a flag/argument value pair from here forward.

Further, it is often the case that when implementing the design of a software program, or when upgrading a software program to provide additional functionality, it may be determined that additional inputs from the end user are necessary. In such a case, the software program's underlying implementation code may need to be altered in multiple places for administering this new input argument. For example, logic must be added for validating the new input argument, the logic that outputs usage information about how to use the program must be altered to encompass the new input argument, logic must be added to route the new input argument to the appropriate software subpiece (e.g. a module, method, plug-in or subroutine) for processing, the code must then be recompiled and built, etc.

Therefore, there are several risks involved when a software program needs even just a single additional input parameter from the user. These risks include: introducing new software bugs when altering existing code, forgetting to update all the necessary places in the software code to handle the new input parameter, and the additional time and expense incurred by a software developer for making the code changes and updates for just being able to have the existing software code handle the new input parameter. This process has to be repeated every time it is determined that a new input argument is necessary and therefore the risk increases with each additional input argument.

Therefore, there is a need in the art for a system a method which allow for the software code that handles the administration of the input and output arguments to be written once, and which allows addition of new input or output arguments without unnecessarily modifying the software program's code, rebuilding or compiling it. This allows the software developer to focus solely on the subpiece of the software that processes the new input or output argument.

BRIEF DESCRIPTION OF THE DRAWINGS

The following detailed description when taken in conjunction with the figures presented herein provide a complete disclosure of the invention.

SUMMARY OF THE INVENTION

Our invention allows for software code in a program that handles the administration of the input and output arguments to be written once. The administration code includes the code that validates the input/output argument, the code logic that outputs usage information, and the code that routes the command parameter to the appropriate software subpiece. Through use of the invention, the software program's code does not have to be updated or altered when it is determined that additional I/O arguments are necessary, nor does the software program's code have to be rebuilt or compiled. This allows the software developer to focus solely on the subpiece of the software that processes the input argument.

The invention determines what input arguments are possible and mandatory to a program at runtime by reading an Argument Descriptor File ("ADF"), preferably in Extensible Markup Language ("XML"), that declares all command line and invocation parameters. The ADF file houses all information surrounding the input argument. Therefore, when it is determined that a new input argument is necessary, only the ADF needs to be altered to include the new input argument descriptor, and only the new software code subpiece must be introduced to process this new argument. The administrative code for the new argument does not have to be altered, because the code that handles the administrative processing of the argument assumes that zero or more arguments are defined in the ADF.

DESCRIPTION OF THE INVENTION

By determining what input arguments are possible and mandatory to a program at runtime by reading in an Extensible Markup Language ("XML") file that declares all command line and invocation parameters according to our invention, new arguments may be implemented in a software program simply to including the new argument descriptor in the argument XML file, and implementing only the new software subpiece. The administrative code for the new argument does not have to be altered, because the code that handles the administrative processing of the argument assumes that zero or more arguments are defined in the argument XML file. This reduces or even eliminates the introduction of new software errors due to incorrect or overlooked modifications to the existing software program pieces, modules, etc., and reduces software development and testing cycles considerably.

Another advantage of using this invention is the ability to release various levels of the program without having to alter code. Different levels of software can be shipped with the only difference between them being the file that enables/describes the input arguments available to that level. This can act as a filter allowing each level of software release to be enabled with more input parameters, that would connotate an increased level of function supported by that level of software.

This invention has the ability to determine at runtime what input arguments are possible and mandatory for running the software program. Therefore, optional and mandatory input arguments are not statically defined in the software program's code. Rather, the input arguments are declared and configured in an external XML file. Thus, the software program's code does not have to be recompiled and rebuilt when it is determined that a new input argument is necessary for the software program's execution. Rather, only the xml file has to be altered.

Also, since the command line arguments are declared in a text XML file, minimal programming and editing skills and tools are required to update the argument descriptor XML file. XML is easily read and understood by many technicians and engineers in the computer programming field.

A further advantage provided by the invention is that only one set of argument administration code has to be written, since the input and output parameters are defined in one location, thereby increasing the maintainability and testability of the code.

Therefore, when an additional input argument is needed, the code does not have to be altered—only the XML file must be altered. This keeps the changes necessary for the input argument isolated to one location. The algorithm for processing the input arguments expects to find zero or more command line arguments in the file, but is loosely coupled from the specifics of that argument.

Computing Platforms in General

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices. In time, it is reasonable to expect the computing capabilities of such portable devices to reach that which is necessary for running sophisticated application programs, migrating programs, and even developing programs.

Therefore, it is useful to review a generalized architecture of a computing platform which may span the range of implementation, from a high-end web or enterprise server platform, to a personal computer, to a portable PDA or web-enabled wireless phone.

Figure 1:
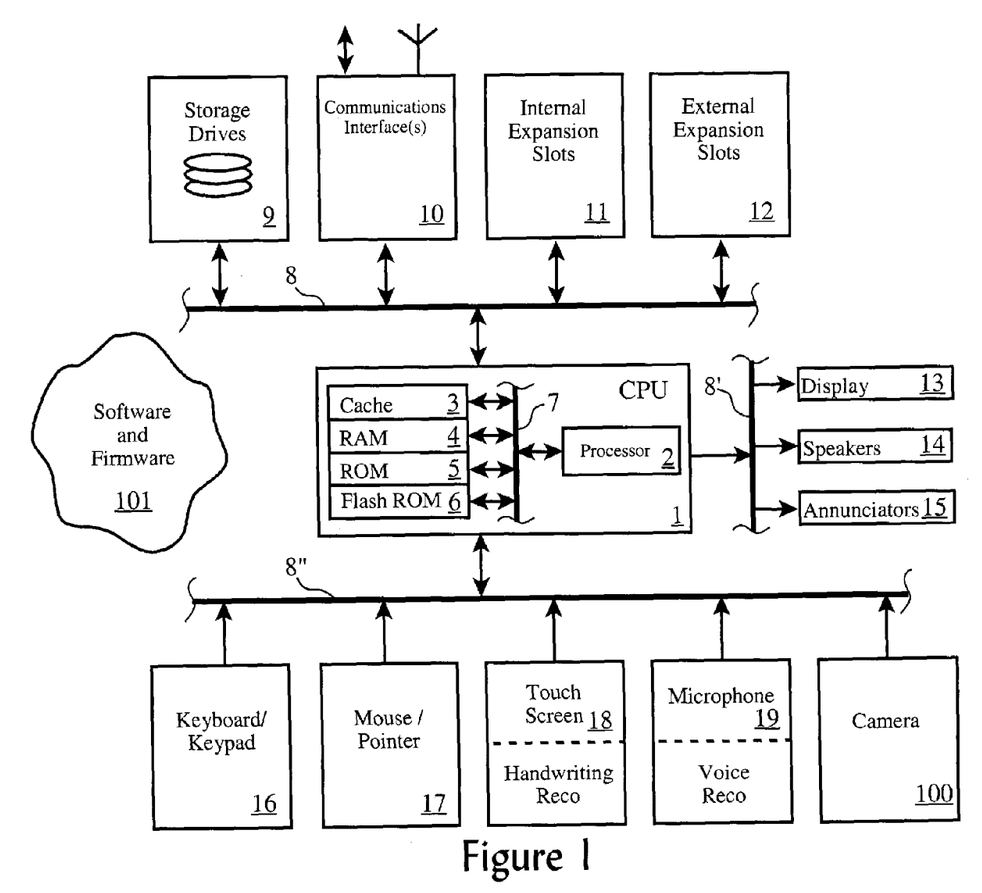
FIG. 1 provides a general view of a computing platform suitable for developing, running or migrating application programs and software products.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip [™] and Jaz [™], Addonics SuperDisk [™], etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint [™]. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 4:
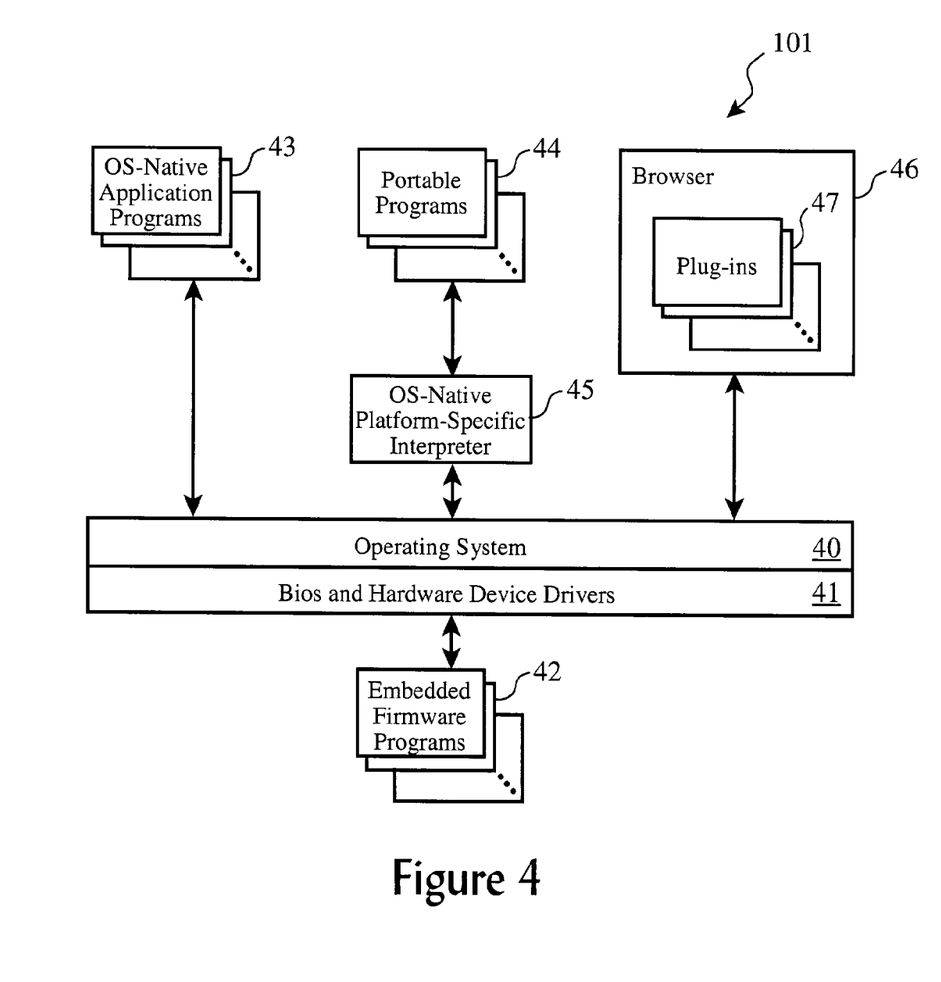
FIG. 4 shows a generalized organization of software and firmware associated with the generalized architecture of FIG. 1.

Turning to now FIG. 4, more detail is given of a generalized organization of software and firmware (101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java [™] scripts and programs.

Often, computing platforms are also provided with a form of web browser or micro-browser (46), which may also include one or more extensions to the browser such as browser plug-ins (47).

The computing device is often provided with an operating system (40), such as Microsoft Windows [™], UNIX, IBM OS/2 [™], LINUX, MAC OS [™] or other platform specific operating systems. Smaller devices such as PDA's and wireless telephones may be equipped with other forms of operating systems such as real-time operating systems ("RTOS") or Palm Computing's PalmOS [™].

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 4 describe in a general sense the various hardware components, software and firmware programs of a wide variety of computing platforms, including but not limited to personal computers, PDAs, PIMs, web-enabled telephones, and other appliances such as WebTV [™] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Our Argument Descriptor File

The argument descriptor file preferably contains the following information about each possible program external argument:

(a) a corresponding unique identifying flag (e.g. "-first", "-last", etc.);
(b) a definition of whether or not the argument is mandatory (i.e. the program should not run without it being declared) or optional (i.e. the program still runs without the argument, but it just does not exercise the function that corresponds to that argument or uses a default value for that argument);
(c) a short description of the item that should be input or output (Example: file_name); and
(d) a detailed description of the argument (Example: The JAVA JAR, WAR or EAR file that is to be migrated).

Table 1 provides an example argument descriptor file in XML. It will be readily recognized by those skilled in the art that other types of file format can be employed for such a descriptor file without departing from the scope of the present invention.

TABLE 1

Example XML Argument Descriptor File

```
<?xml version="1.0" encoding= "UTF=8"?>
</DOCTYPE controller SYSTEM "Controller Args.dtd">
<controller>
    <command-parameters>
        <command-line-param flag="in" mandatory="true">
            <item-desc>file_name(s)</item-desc>
            <description>a single input ear file, or list of jar and/or war file separated by
            ";"to migrate </description>
        </command-line-param>
        <command-line-param flag="out" mandatory="false">
```

TABLE 1-continued

Example XML Argument Descriptor File

```
            <item-desc>file_name</item-desc>
            <description>optional, migrated ear file</description>
        </command-line-param>
        <command-line-param flag="wlv" mandatory="true">
            <item-desc>{51 | 60 | 61}</item-desc>
            <description>WebLogic version of the input file </description>
        </command-line-param>
        <command-line-param flag="wasv" mandatory="true">
            <item-desc>{40 | 50}</item-desc>
            <description>WebSphere version the output file should target. </description>
        </command-line-param>
        <command-line-param flag="dbvendor" mandatory="false">
        <item-desc>
                {SQL92 | SQL99 | DB2UDBNT_V51 |DB2UDBNT_V71
                | DB2UDBNT_V72| DB2UBDAS400_V4 | DB2UDAS400_V5
                | DB2UDBOS390_V6 | DB2UDBOS390_V7 | INFORMIX_V73
                | INFORMIX_V92 | INSTANTDB_V326 | MSSQLSERVER_V7
                | MSSQLSERVER_V70 | MYSQL-V323 | ORACLE_V8
                | SYBASE_V1192 | SYBASE_V12}
            </item-desc>
            <description> Database vendor type used for container managed persistence
            </description>
        </command-line-param>
        <command-line-param flag="ddl" mandatory="false">
            <item-desc>file-name</item-desc>
            <description>Name of the DDL file used to create database tables.
            </descripton>
        </command-line-param>
    </command-parameters>
</controller>
```

The example argument descriptor file given in Table 1 is useful for migrating application programs from one computing environment (e.g. BEA Systems, Inc., WebLogic [™] environment) to an IBM WebSphere environment. This, of course, is just one possible use of the present invention, but is provided as a example for illustration. For a more complete understanding of migrating such applications from WebLogic [™] to WebSphere, please refer to the document "Migrating WebGain VisualCafé Web applications deployed onBEA WebLogic Servers to IBM WebSphere Studio Application Developer -- Part 3" by Ann Black, et al., published by IBM which is incorporated herein by reference in its entirety.

Program Invocation Using Argument Descriptor File

Figure 2:
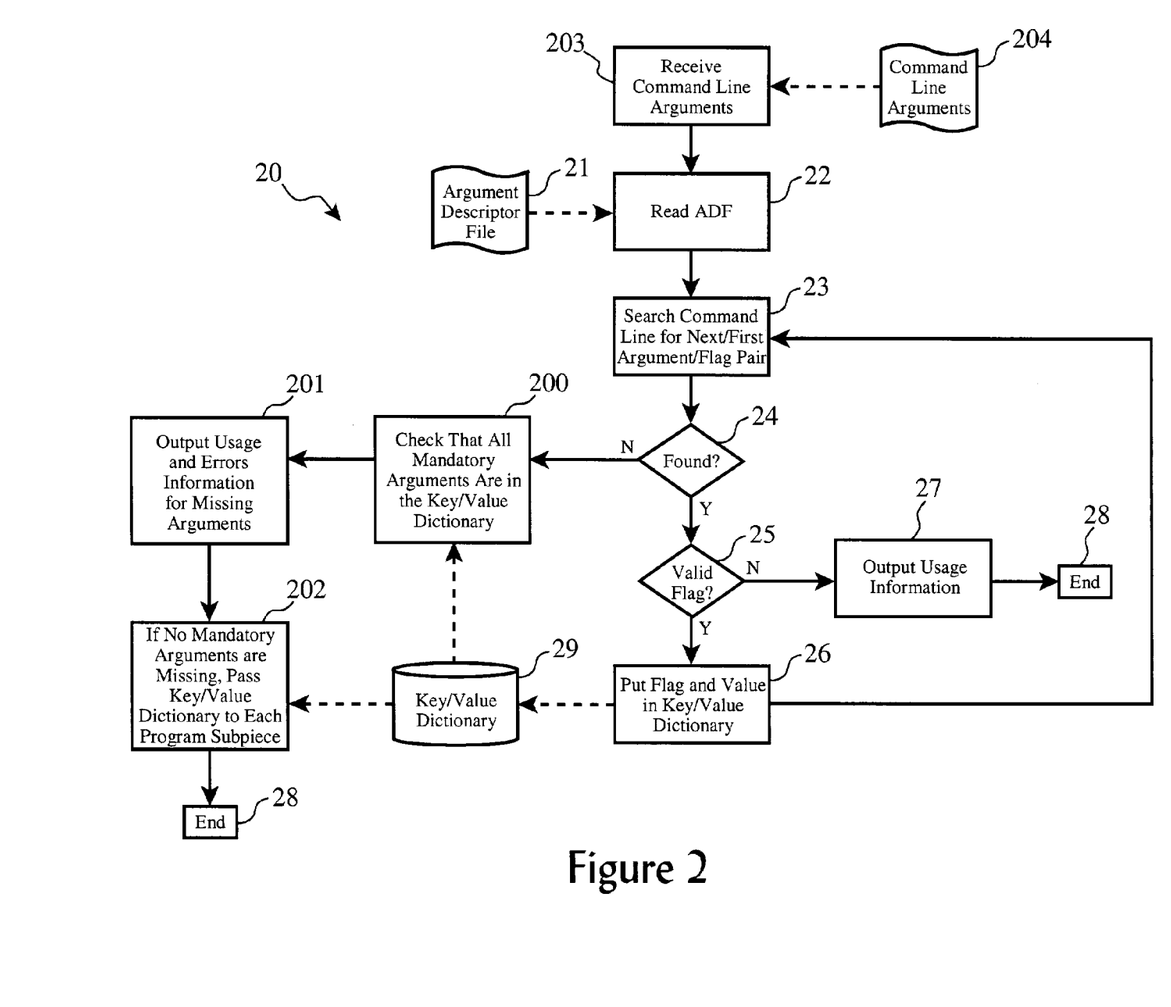
FIG. 2 discloses the logical process of the administration code according to the present invention.

When an input argument is declared on the command line for input into the software program, the logical process shown in FIG. 2 and summarized in the pseudocode of Table 2 is followed.

TABLE 2

Program Invocation Method

```
Read (22) the XML Input Argument Descriptor file (21)
For each input flag/argument value pair provided on the
command line (23, 24) {
    Check (25) that the flag is a valid flag by comparing it against the
    available flags in the descriptor file
        if (flag is valid) {
            place (26) flag and its argument value into a key/value dictionary
            (29) type structure within the flag as the key end the
            argument as the value
        }
        else if (flag is NOT valid) {
            output (27) usage information about the program
            exit program (28)
        } /* endif */
} /* end for */
```

TABLE 2-continued

Program Invocation Method

```
/* in order to make sure all mandatory input arguments
were provided (200): */
For each mandatory input argument declared in the
argument descriptor file (21) {
    find its equivalent in the populated dictionary (29)
    if (flag not found){
        output (201) message on missing flag
        output (201) usage information about the program
        exit program (28)
    } /* endif */
} /* end for */
Pass (202) dictionary (29) to each subpeice of software for processing
}
/* For outputting program usage information (27, 201): */
For each argument definition defined in the xml file{
    add the flag that declares the input argument
    add the value description identifier
    add the description of what the input argument provides
    add a newline character
} /* end for */
output buffer to the standard output
```

According to this method or logical process, a set of command line arguments (204) are received (203), and an Argument Descriptor File ("ADF") (21) is read. The command line arguments (204) are searched for a first (or next) flag/argument pair. Following the previous example, a first pair describing the "-in inputfilejar" parameter would be found.

The found flag type (e.g. "-in") is checked (25) for validity against the allowable flags defined in the ADF, and if the flag is valid, the flag (e.g. "-in") and it's value from the command line arguments (e.g. "inputfilejar") are stored (25) in a key/value dictionary (29), and processing continues with searching (23) the received command line arguments for another flag/argument pair.

If an invalid flag type is encountered, usage information about the flag and value is output (e.g. printed to the screen or to a log file), and processing stops (28).

Once all flag/argument pairs have been validated and loaded into the key/value dictionary, a check (200) is made to ensure that all mandatory parameters have been found in the received command line arguments (203) by searching the ADF (21) and for each mandatory argument, verifying that the key/value dictionary (29) contains a corresponding entry. If a mandatory parameter is missing, processing may be ended (28) and usage information may be output. If all mandatory parameters are found, then usage information is preferably output (201), and the key/value dictionary is passed to each program subpiece.

Program Subpiece Usage of Argument Values

By interrogating the contents of the key/value dictionary, each program subpiece (e.g. each module, method instance, subroutine, plugin, etc.) will find the data it needs, and will find an place to output its results as necessary, independently of other program subpieces. As the subpieces will ignore entries in the dictionary which they do not need, the addition of entries caused by the addition of command line arguments will not cause any processing changes or errors in the existing subpieces.

Figure 3:
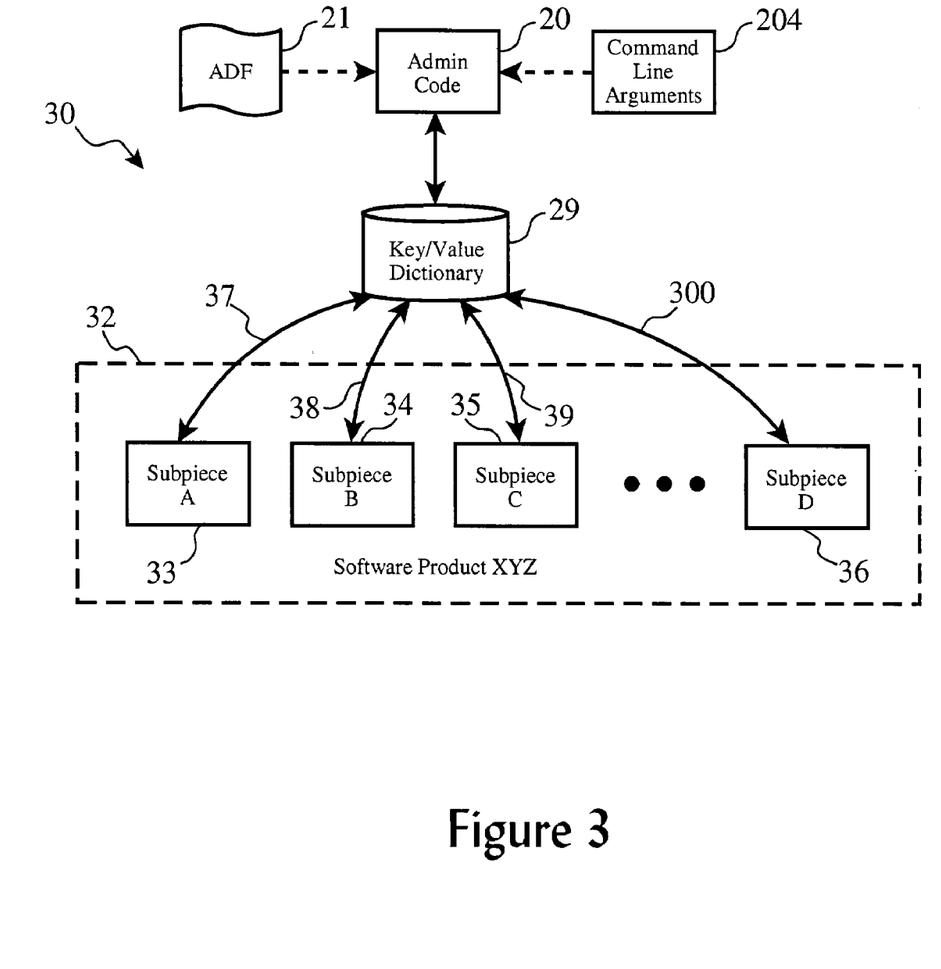
FIG. 3 illustrates the usage of the key/value dictionary with respect to program invocation and subpiece interrogation of the dictionary.

For example, as shown in FIG. 3, consider an first version of a software product XYZ (32) which has three subpieces or components to the program: subpiece A (33), subpiece B (34), and subpiece C (35). And, assume that in an early version of product XYZ (32), subpiece A requires an input file name to operate, subpiece B requires a file format such as text/binary/encrypted, and subpiece C requires an output destination such as file/screen. So, a command line invocation of the program may appear something like:

```
run XYZ-in "inputfile.doc"-format "encrypted"-dest
    "screen"
```

Using the method of the present invention, when this is received as the command line invocation and arguments (204) by the administration code (21), the ADF (21) is consulted, and the three arguments are loaded into the key/value dictionary (29). As each subpiece subsequently executes, each will interrogate (37, 38, and 39) the dictionary (29) for the information it needs, ignoring all other entries in the dictionary (29).

Later, if the product XYZ is modified to include subpiece D (36) which is a communication function, and which needs a communication protocol parameter such as the selection to communicate by UDP or TCP/IP, the argument descriptor file (21) would be modified to include a fourth argument such as "-protocol", and the new command line invocation would appear something like:

```
run XYZ-in "infile.doc"-format "encrypted"-dest
    "file"-protocol "UDP"
```

Prior to execution, the administration code (20) then would load all four command line arguments into the key/value dictionary (29), having checked to verify the validity of all the arguments (including the new protocol argument) with the ADF (21).

During execution of this new version of product XYZ (32), subpiece A (33) would interrogate (37) the dictionary (29) for the proper value of the input file name, and would not notice the addition or existence of the protocol parameter. Likewise, subpieces B (34) and C (35) would interrogate (38, 39) the dictionary (29) for their needed argument values, and would also be unaffected by the addition or existence of the new protocol parameter. The new subpiece D (36), however, would find the information it needs in the dictionary (29), too.

As such, the product XYZ (32) may be modified to incorporate new or modified subpieces which cause a change in the argument list without the possibility of introducing errors in the existing or unmodified subpieces. This decouples the product's argument list from a specific "build" or compilation version of the product, allowing the argument list to be independently defined and controlled by the argument descriptor file.

DETAILS OF THE PREFERRED EMBODIMENT

The invention has been implemented as part of an underlying IBM framework, named "Controller Framework", for creating application program migration utility tools. Currently, the migration utility that uses this invention is the well-known IBM WebSphere WL2WAS migrator, which automates to the extent possible the migration of applications originally configured to run under BEA's WebLogic [™] server environment to IBM's WebSphere Application Server environment. The purpose of this tool is to help ease the migration process that customer's experience when trying to move or "port" their existing WebLogic applications to WebSphere.

It will be readily apparent to those skilled in the art that the present invention can be employed in a wide variety of computing environments and applications without departing from the spirit and scope of the invention, including but not limited to use of alternate programming languages, methodologies, server suites, etc. Therefore, the scope of the present invention should be determined by the following claims.

What is claimed is:

1. An automated method comprising the steps of:
   receiving an application software program configured for execution by a first application server system;
   migrating said application software program to a second application server system by adapting external arguments for said software program to be compatible with said second application server system by:
   (a) upon invocation of said application software program providing one or more arguments to be passed into said application software program by said second application server system, said arguments being coupled in flag and value pairs;
   (b) using an argument descriptor file provided by said second application server system to said application software program to determine if each flag and value pair provided is a valid flag and value pair;
   (c) responsive to validating said flag and value pairs, loading by said application software program said flags and values into a key/value dictionary;
   (d) passing said loaded dictionary from said second application server system to said software program such that the software application program may access the values within the dictionary; and
   (e) determining from said argument descriptor file one or more mandatory flag and value pairs, verifying that all said mandatory flag and value pairs are present, and responsive to finding a missing mandatory flag and value pair, disabling execution of said software program.

2. The method as set forth in claim 1 further comprising the step of outputting information regarding the usage of each flag and value pair.

3. The method as set forth in claim 1 further comprising the step of accessing said key/value dictionary by subpieces of said software program subsequent to said step of passing the dictionary.

4. The method as set forth in claim 1 wherein said step of using an argument descriptor file comprises reading an Extensible Markup Language file.

5. The method as set forth in claim 1 wherein said step of providing one or more arguments upon invocation of a software program comprises receiving one or more arguments from a command line invocation of a software program.

6. The method as set forth in claim 1 wherein said step of loading said flags and values into a key/value dictionary comprises loading flags and values into a computer readable medium selected from the list of a database, a computer file, and a data structure in memory.

7. A computer readable medium coded with software for performing the steps of:
   receiving an application software program configured for execution by a first application server system;
   migrating said application software program to a second application server system by adapting external arguments for said software program to be compatible with said second application server system by:
   (a) upon invocation of said application software program providing one or more arguments to be passed into said application software program by said second application server system, said arguments being coupled in flag and value pairs;
   (b) using an argument descriptor file provided by said second application server system to said application software program to determine if each flag and value pair provided is a valid flag and value pair;
   (c) responsive to validating said flag and value pairs, loading by said application software program said flags and values into a key/value dictionary; and
   (d) passing said loaded dictionary from said second application server system to said software program such that the software application program may access the values within the dictionary; and
   (e) determining from said argument descriptor file one or more mandatory flag and value pairs, verifying that all said mandatory flag and value pairs are present, and responsive to finding a missing mandatory flag and value pair, disabling execution of said software program.

8. The computer readable medium as set forth in claim 7 further comprising software for outputting information regarding the usage of each flag and value pair.

9. The computer readable medium as set forth in claim 7 further comprising software for accessing said key/value dictionary by subpieces of said application program subsequent to said step of passing the dictionary.

10. The computer readable medium as set forth in claim 7 wherein said software for using an argument descriptor file comprises software for reading an Extensible Markup Language file.

11. The computer readable medium as set forth in claim 7 wherein said software for providing one or more arguments upon invocation of a software program comprises software for receiving one or more arguments from a command line invocation of a software program.

12. The computer readable medium as set forth in claim 7 wherein said software for loading said flags and values into a key/value dictionary comprises software for loading flags and values into a computer readable medium selected from the list of a database, a computer file, and a data structure in memory.

13. A system comprising:
   an application software program configured for execution by a first application server system;
   a migration tool configured to migrate said application software program to a second application server system by adapting external arguments for said software program to be compatible with said second application server, said tool providing: (a) one or more pairs of argument flags and values associated with an invocation command for said application software program; (b) an invoker operable to start execution of said application software program or instance of said application software program on said second application server system, said invoker being configured to receive said argument pairs; (c) an argument descriptor file disposed to be accessible by said invoker, said argument descriptor file containing definitions for valid flag and value pairs; (d) a key/value dictionary for holding flag and value pairs, said key/value dictionary being accessible by said application software program; (e) a validater-loader operable by said invoker, said validater-loader being configured to check all received argument flag and value pairs against said definitions in said argument descriptor file, and being configured to load valid argument pairs into said key/value dictionary such that they may be accessed by said invoked application software program; and (f) a mandatory argument checker configured to determining from said argument descriptor file one or more mandatory flag and value pairs, verify that all said mandatory flag and value pairs are present, and responsive to finding a missing mandatory flag and value pair, disable invocation of said software program.

14. The system as set forth in claim 13 further comprising an argument usage output function for outputting information regarding the usage of each flag and value pair.

15. The system as set forth in claim 13 wherein said key/value dictionary is accessible by one or more subpieces of said invoked software program.

16. The system as set forth in claim 13 wherein said argument descriptor file comprises an Extensible Markup Language file.

17. The system as set forth in claim 13 wherein said argument pairs and software program invocation command comprise a command line invocation of a software program.

18. The system as set forth in claim 13 wherein said key/value dictionary comprises a computer readable medium selected from the list of a database, a computer file, and a data structure in memory.

* * * * *